United States Patent [19]

Hammer et al.

[11] Patent Number: 4,967,798
[45] Date of Patent: Nov. 6, 1990

[54] PACKAGING CASING BASED ON CELLULOSE HAVING IMPROVED PROCESSING CHARACTERISTICS

[75] Inventors: Klaus-Dieter Hammer, Mainz; Hermann Winter; Gerhard Krag, both of Wiesbaden, all of Fed. Rep. of Germany

[73] Assignee: Hoechst Aktiengesellschaft, Frankfurt am Main, Fed. Rep. of Germany

[21] Appl. No.: 498,448

[22] Filed: Mar. 19, 1990

Related U.S. Application Data

[63] Continuation of Ser. No. 184,988, Apr. 22, 1988, abandoned.

[30] Foreign Application Priority Data

Apr. 24, 1987 [DE] Fed. Rep. of Germany ....... 3713712

[51] Int. Cl.$^5$ .................. F16L 11/00; A22C 13/00
[52] U.S. Cl. ...................... 138/118.1; 138/145; 138/177; 138/174; 427/288; 426/105; 426/135; 426/138; 428/34.3; 428/34.8; 428/35.7; 428/36.2; 428/36.9; 428/141
[58] Field of Search ............. 138/118, 118.1, 145, 138/146, 177, 178, 172, 174, 103, DIG. 7, 137, 124, 125, 126; 426/105, 135, 138; 428/34.8, 141, 34.1, 34.2, 34.3, 35.2, 35.5, 35.7, 36.1, 36.2, 36.8, 36.9, 36.91, 36.92; 427/256, 288

[56] References Cited

U.S. PATENT DOCUMENTS

| | | | |
|---|---|---|---|
| 2,345,543 | 3/1944 | Wohnsiedler et al. | 260/72 |
| 2,573,956 | 11/1951 | Daniel et al. | 117/76 |
| 2,616,874 | 11/1952 | Yost et al. | 260/70 |
| 2,796,362 | 6/1957 | Wooding et al. | 117/71 |
| 2,812,259 | 11/1957 | Marx | 426/105 |
| 2,926,154 | 2/1960 | Kelm | 260/29.2 |
| 3,378,379 | 4/1968 | Shiner et al. | 99/176 |
| 3,695,904 | 10/1972 | Coleman | 99/176 |
| 3,833,022 | 9/1974 | Turbak et al. | 426/105 |
| 3,935,320 | 1/1976 | Chiu et al. | 426/105 |
| 4,142,013 | 2/1979 | Hammer et al. | 426/135 X |
| 4,283,426 | 8/1981 | Schenk et al. | 428/36 |
| 4,287,217 | 9/1981 | Hammer et al. | 138/118.1 |
| 4,289,171 | 9/1981 | Rassbach | 138/145 |
| 4,356,199 | 10/1982 | Hammer et al. | 426/135 X |
| 4,390,569 | 6/1983 | Heinrich et al. | 427/366 |
| 4,396,039 | 8/1983 | Klenk et al. | 426/135 |
| 4,401,135 | 8/1983 | Andrä et al. | 426/135 |
| 4,528,225 | 7/1985 | Hutschenreuter et al. | 138/118.1 |
| 4,529,634 | 7/1985 | Hammer et al. | 426/105 X |
| 4,666,750 | 5/1987 | Hammer et al. | 428/36 |
| 4,670,273 | 6/1987 | Hammer et al. | 138/118.1 |

FOREIGN PATENT DOCUMENTS 1091105  11/1967  United Kingdom.

*Primary Examiner*—James E. Bryant, III
*Attorney, Agent, or Firm*—Foley & Lardner, Schwartz, Jeffery, Schwaab, Mack, Blumenthal & Evans

[57] ABSTRACT

The tubular packaging casing, in particular a synthetic sausage casing, comprised of fiber-reinforced cellulose, in which the fiber-reinforcement is coated at least on the outside with a cellulose layer, and a surface layer on the cellulose layer. The surface layer comprises a water-insoluble cationic resin containing particles of fibers of synthetic resin or cellulose, in particular particles of a vinyl chloride homopolymer or copolymer.

20 Claims, 1 Drawing Sheet

PACKAGING CASING BASED ON CELLULOSE HAVING IMPROVED PROCESSING CHARACTERISTICS

This application is a continuation of application Ser. No. 07/184,988, filed Apr. 22, 1988, abandoned.

BACKGROUND OF THE INVENTION

The present invention relates to a packaging casing, built up from a base tube of fiber-reinforced cellulose, the fiber reinforcement being coated at least on one surface with a layer of regenerated cellulose. The invention also relates to a process for production of the packaging casing, in which a fibrous base tube is provided with a cellulose layer at least on its outside, by means of the viscose process.

Tubular synthetic sausage casings of this general type have long been known. It has also previously been disclosed that the adhesion of dyes, fungicidal salts and synthetic resin layers to the outer cellulose layer of fiber-reinforced tubular casings can be improved by an external coating layer or adhesion-promoting interlayer of cationic resins (U.S. Pat. Nos. 3,695,904; 4,666,750 and 4,283,426).

It is also known that sausage emulsions are filled into these cellulose casings when they are in the moistened state. The water thus serves as a plasticizer for the cellulose and gives the casing the necessary pliability and extensibility. When these soft, flexible casings, in the form of sections tied off at one end, are pushed onto the stuffing horn of the filling machine, however, there are problems in gripping and retaining the casings manually.

SUMMARY OF THE INVENTION

It is therefore an object of the present invention to provide improved packaging casings with respect to their processing characteristics.

It is a particular object to provide a sausage casing that, on the one hand, can easily be pushed onto a stuffing horn in the wet state, but on the other hand, retains unimpaired its optical appearance, particularly its surface gloss.

It is also an object of the invention to provide an improved process for producing the packaging casings according to the invention.

In accomplishing the foregoing objects, there has been provided in accordance with one aspect of the present invention a tubular packaging casing, comprising a base tube of fiber-reinforced cellulose, the fiber reinforcement being completely coated with a cellulose layer at least on the outside; and an outer surface layer on the outer cellulose layer of the base tube, the outer surface layer comprising a water-insoluble cationic resin and particles or fibers of cellulose or a synthetic resin.

In accordance with another aspect of the invention, there has been provided a process for the production of the packaging casing as defined above, comprising the steps of impregnating a tubular fibrous substance and coating same at least on its outside with viscose; precipitating the viscose to produce a resulting tube of fiber-reinforced cellulose hydrate gel; coating the tube of cellulose hydrate gel on its outside with an aqueous dispersion of the still water-soluble cationic resin; and drying the tube at an elevated temperature sufficient to crosslink the cationic resin and convert it to its water-insoluble form. In the process, the aqueous dispersion contains from about 0.5% to 10% by weight of particles or fibers of cellulose or a synthetic resin.

Other objects, features and advantages of the present invention will become apparent from the following detailed description of preferred embodiments. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The invention may be more readily understood by referring to the accompanying drawing by which

DETAILED DESCRIPTION OF PREFERRED EMBODIMENTS

Figure 1:
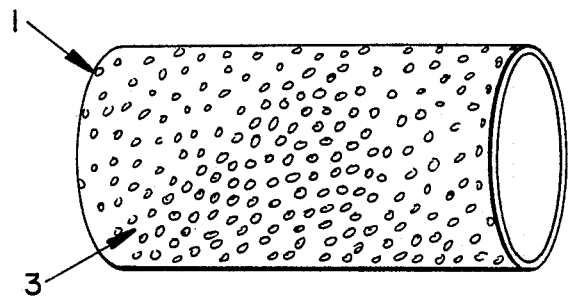
FIG. 1 is a schematic view of a casing according to the invention.

The achievement of this improvement is attained by the combination of a heat-cured resin with synthetic resin or cellulose fibers, in particular with synthetic resin or cellulose particles as the two principal components of the surface layer. The outer surface of the packaging casing shows a distinct roughness. As a result, the casing possesses improved processing characteristics, and in particular can readily be fitted onto the stuffing horn of filling machines in the moist state. Virtually no change is detectable in the surface gloss or the transparency of the casing. The tubes can also be wound up in the flattened state without damage to the relatively soft and scratch-sensitive cellulose surface. The particles or fibers are permanently bonded with the surface of the casing. The resin layer encloses the particles or fibers completely, or at least to the extent that they adhere firmly.

The particles or fibers embedded in the outer resin layer consist of cellulose or synthetic resin, the selection of the synthetic resin being governed by the following criteria. During the final drying process, when the resin of the outer layer makes the transition into its water-insoluble form, the material used for the particles or fibers must not run to form a film or dissolve in the resin, but must retain its particulate structure as far as possible. In addition, the synthetic resin and cellulose particles should if possible possess a specific weight which approximately corresponds to the density of the coating dispersion containing the cationic resin, so that they remain suspended in this dispersion and possess no tendency to float or sediment.

Particularly suitable synthetic resin particles are those based on homopolymers or copolymers containing vinyl chloride units, and in particular those of polyvinyl chloride having a particle size greater than about 0.1 $\mu$m. These relatively coarse particles are formed as a byproduct in the centrifuging of PVC dispersions which have to be freed of particles of a size greater than 0.1 $\mu$m for paper coating. This provides a particularly economical starting substance for the production of the casing according to the invention.

In the case of particles having a size of less than about 0.2 μm, the effect aimed at is relatively slight, whereas in the case of particles greater than about 5 μm the danger exists that they will not be sufficiently retained by the resin layer. In general, particles having a diameter in the range from about 0.2 to 2 μm are particularly advantageous. When fibers are used, preference is given to fibers having a relatively short length, that is to say less than about 10 μm, in particular less than about 5 μm. Fibers having an average length of from about 0.1 to 1 μm are generally used.

The cationic resin is, for example, a product of a condensation reaction of protein of animal or vegetable origin, such as gelatin, soybean protein, groundnut protein or wheat protein, in particular casein, with an aldehyde, such as malonaldehyde or glutaraldehyde, in particular formaldehyde or glyoxal, the proportion of aldehyde being from about 5 to 15, in particular from about 6% to 10% by weight, or a product of a condensation reaction of urea with formaldehyde (U.S. Pat. No. 2,616,874) or of melamine and formaldehyde (U.S. Pat. Nos. 2,796,362 and 2,345,543). Preferred products are those obtained by a condensation reaction of epichlorohydrin with a polyamine, polyamide or polyaminepolyamide (U.S. Pat. Nos. 2,573,956, 2,926,154 or 3,378,379). Suitable polyamines for the reaction with epichlorohydrin are simple alkylenediamines or polyalkylenepolyamines, such as for example, diethylenetriamine, triethylenetetramine, tetraethylenepentamine and the corresponding polypropylene- and polybutylenepolyamines.

The polyamide-polyamines are preferably products of a condensation reaction of a saturated, aliphatic, dibasic acid having 3 to 8 carbon atoms in the molecule with one of the above-mentioned polyamines which possesses at least one secondary and two primary amino groups.

The coating on the outside of the tube comprises a total of from about 40 to 200 mg, preferably from about 60 to 150 mg, of water-insoluble cationic resin, based on a square meter of base surface. These values were determined as follows:

200 mg of surface material are scraped off from 500 $cm^2$ of the outer surface, and the nitrogen content of the scraped-off material is determined, for example, by combustion analysis. For comparison, the outside of the tube composed of the same base material, though without coating, is tested for its nitrogen content. For this purpose, 200 mg of surface material are scraped off in an analogous manner from 500 $cm^2$ of inner surface in each case, and the nitrogen content is determined in the same way. Obtaining the difference between the nitrogen values for the coated and the uncoated tube gives the nitrogen value for the outer coating, and from this the content of cationic resin on the outside of the tube can be obtained.

The outer coating—due to the use of aqueous resin dispersion in the production process—contains small amounts of chemical emulsifier, so that the intended properties of the coating or of the tube casing with coating on the outside are not influenced.

The sausage casing is used primarily in the production of sausages of the raw sausage type, such as salami or hard sausage. In this case, it possesses an inner coating, which is conventional for this sausage, to improve the adhesion between sausage meat and cellulose casing or to improve the peelability of the casing from the sausage meat.

The sausage casing has a conventional water content of, for example, from about 5% to 15% by weight or possesses a very high water content of about 25% by weight or more, so that it need not be moistened before filling.

The production of fiber-reinforced tubular casings based on cellulose hydrate is known. They are conventionally produced by coagulation of the alkaline viscose solution, applied to the outside of a tubular fiber reinforcement, with acidic precipitation liquid and regeneration of the cellulose, and contain plasticizers, such as glycerol.

The fiber reinforcement usually has a weight per unit area of about 17 to 28 $g/m^2$ and is preferably a paper inlay or a fiber nonwoven of hemp fibers. It is preferably impregnated and coated with viscose only on the outside. If an additional viscose coating takes place on the inside of the fiber tube, the proportion of the viscose on the inside relative to the total viscose applied is a maximum of about 30% by weight. The regenerated cellulose is distributed in a corresponding manner in the cross-section of the casing, that is to say that about 70% to 100% of the cellulose is on the outside.

Processes for the external coating of cellulose hydrate tubes have likewise been described, for example, in European Patent No. 37,025 and in the references cited therein.

With reference to the drawings, FIG. 1 shows a tubular packing casing 1 according to the invention, having an outer surface layer 3 which displays increased surface roughness.

Figure 2:
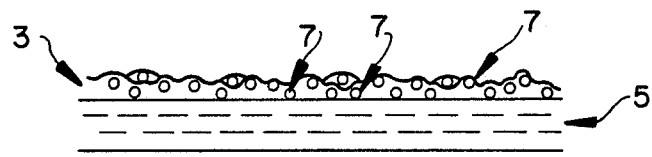
FIG. 2 is an enlarged cross-sectional view of a preferred embodiment of the casing.

FIG. 2 shows a cross-sectional view of the casing, with a base tube 5 of fiber-reinforced cellulose and an outer surface layer 3 comprising a water-insoluble cationic resin, within which are embedded particles 7 of synthetic resin or cellulose.

Figure 3:
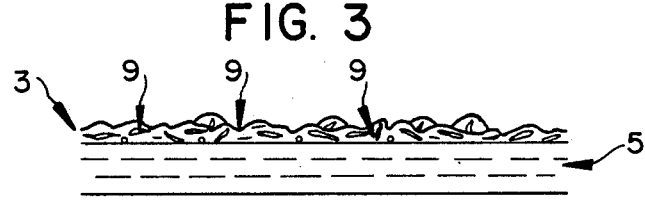
FIG. 3 is an enlarged cross-sectional view of another preferred embodiment of the casing.

FIG. 3 shows another cross-sectional view, in which the base tube 5 is overlain with an outer surface layer 3 as above, within which are embedded fibers 9 of synthetic resin or cellulose.

The invention is explained in detail by means of the examples which follow. The starting material in each case is a fiber-reinforced tube having an outer layer of cellulose hydrate gel, which has been produced by treating the outside of the fiber tube with viscose, conventional coagulation and regeneration of the outer viscose layer with acidic precipitation and regeneration liquid, and washing with water. The tube of fiber-reinforced cellulose hydrate gel obtained is coated on its outside with the dispersion according to the invention and is dried in the inflated state in a drying tunnel at 120° C. to 150° C., the cationic resin being cured and, in its water-insoluble form, fixed together with the particles to the cellulose surface. The tube is then adjusted to the desired moisture content.

The finished tube is further processed as a section tied off at one end. The tie comprises a string or cord, with or without an additional metal clip.

EXAMPLE 1

The aqueous coating dispersion has the following composition:
  2% by weight of a heat-curable, still water-soluble polymer of ethylene diamine, diethylene triamine, adipic acid and epichlorohydrin (RESAMIN HW 601 from Cassella) as cationic resin,
  6% by weight of a 50% strength by weight PVC dispersion, equivalent to 3% by weight PVC solids content, having a particle size of 0.1 to 1.6 μm (HOSTALIT E 1069/072 from Hoechst),
10% by weight of glycerol.

The finished tube possesses on its outer surface a layer of 80 mg of cationic resin and 120 mg of PVC particles per square meter of surface.

Sections tied off at one end are produced from the externally coated tube (caliber 65 mm). After moistening, they can readily be pulled onto the stuffing horn of a sausage filling machine, and are much improved in their processing characteristics. The hard sausage produced exhibits the desired high surface gloss and good transparency despite the surface layer.

EXAMPLE 2

The aqueous coating dispersion has the following composition:
2% by weight of the cationic resin of Example 1,
4% by weight of the 50% strength by weight PVC dispersion of Example 1,
10% by weight of glycerol.

The finished tube (caliber 85 mm) possesses on its outside a layer of 65 mg of cationic resin and 65 mg of PVC particles per square meter of surface.

The pieces of tube, tied off into sections and moistened, can readily be pulled onto the stuffing horn of the filling machine in the production of sausages of the salami type. As a result of the increased surface roughness, they possess improved performance characteristics. The finished sausages exhibit the desired surface gloss and good transparency which are known for sausage casings made from this material.

What is claimed is:

1. A tubular packaging casing, consisting essentially of:
   a base tube of fiber-reinforced cellulose, said fiber reinforcement being completely coated with a cellulose layer at least on the outside; and
   an outer surface layer applied to the entire surface of the outer cellulose layer of said base tube, said outer surface layer comprising a water-insoluble cationic resin and particles or fibers of cellulose or a synthetic resin, wherein said particles or fibers are distributed throughout said outer surface layer thereby producing a roughened outer surface which constitutes a means to grip the casing as it is pushed onto a stuffing horn in the wet state.

2. A casing as claimed in claim 1, wherein said outer surface layer comprises particles which comprise a vinyl chloride homopolymer or copolymer.

3. A casing as claimed in claim 1, wherein the particles possess a particle size of less than about 5 μm.

4. A casing as claimed in claim 3, wherein the particles possess a particle size in the range of from about 0.2 to 2 μm.

5. A casing as claimed in claim 1, wherein said outer surface layer comprises fibers which possess a length of less than about 10 μm.

6. A casing as claimed in claim 5, wherein the fibers possess a length of less than about 5 μm.

7. A casing as claimed in claim 5, wherein the fibers possess an average length of from about 0.1 to 1 μm.

8. A casing as claimed in claim 1, wherein the cationic resin comprises a protein, melamine, phenol or urea compound crosslinked with an aldehyde.

9. A casing as claimed in claim 8, wherein the aldehyde comprises formaldehyde or glyoxal.

10. A casing as claimed in claim 1, wherein the cationic resin comprises a polyamine resin or polyamide resin crosslinked with a bifunctional halohydrin or a derivative thereof.

11. A casing as claimed in claim 10, wherein the cationic resin comprises a polyamine-polyamide resin.

12. A casing as claimed in claim 10, wherein the bifunctional halohydrin comprises epichlorohydrin.

13. A casing as claimed in claim 1, wherein the weight ratio of cationic resin to particles or fibers is in the range from about 1:5 to 5:1.

14. A casing as claimed in claim 13, wherein the weight ratio of cationic resin to particles or fibers is in the range from about 1:3 to 2:1.

15. A casing as claimed in claim 1, wherein the content of the cationic resin in the surface layer corresponds to a weight per unit area of from about 40 to 200 mg/m$^2$.

16. A casing as claimed in claim 15, wherein the content of the cationic resin in the surface layer corresponds to a weight per unit area of from about 60 to 150 mg/m$^2$.

17. A casing as claimed in claim 1, wherein said casing possesses, at a water content of from about 5% to 15% by weight and a glycerol content of from about 18% to 22% by weight based on the total weight of the casing in each case, a weight per unit area of from about 70 to 130 g/m$^2$.

18. A casing as claimed in claim 17, wherein said casing possesses a weight per unit area of from about 80 to 120 g/m$^2$.

19. A process for the production of the packaging casing as claimed in claim 1, consisting essentially of the steps of:
   impregnating a tubular fibrous substance and coating same at least on its outside with viscose;
   precipitating the viscose to produce a resulting tube of fiber-reinforced cellulose hydrate gel;
   coating the entire outside surface of said tube of cellulose hydrate gel with an aqueous dispersion of a still water-soluble cationic resin; and
   drying said tube at an elevated temperature sufficient to crosslink said cationic resin and convert it to its water-insoluble form,
   wherein said aqueous dispersion contains from about 0.5% to 10% by weight of particles or fibers of cellulose or a synthetic resin, said particles or fibers having a specific weight approximately corresponding to the density of said aqueous dispersion containing said cationic resin, wherein said particles or fibers are distributed throughout said outer surface layer thereby producing a roughened outer surface which constitutes a means to grip the casing as it is pushed onto a stuffing horn in the wet state.

20. A process for the production of the packaging casing as claimed in claim 19, wherein the aqueous dispersion contains from about 2% to 4% by weight of PVC particles and from about 1% to 5% by weight of a crosslinkable cationic resin comprising a crosslinkable epichlorohydrin/polyamine-polyamide resin.

* * * * *